United States Patent [19]

Schaich et al.

[11] Patent Number: 4,763,316

[45] Date of Patent: Aug. 9, 1988

[54] CIRCUIT ARRANGEMENT FOR CENTRALLY CONTROLLED TIME DIVISION MULTIPLEX TELECOMMUNICATION EXCHANGE FACILITIES

[75] Inventors: Gerhard Schaich, Fuerstenfeldbruck; Ludwig Schoenauer, Sauerlach, both of Fed. Rep. of Germany

[73] Assignee: Siemens Aktiengesellschaft, Berlin and Munich, Fed. Rep. of Germany

[21] Appl. No.: 16,434

[22] Filed: Feb. 19, 1987

[30] Foreign Application Priority Data

Mar. 10, 1986 [DE] Fed. Rep. of Germany ....... 3607903
Mar. 27, 1986 [DE] Fed. Rep. of Germany ....... 3610572

[51] Int. Cl.[4] .............................................. H04J 1/16
[52] U.S. Cl. ........................................ 370/16; 370/58; 379/273; 340/827
[58] Field of Search ...................... 370/16, 58; 379/22, 379/273; 340/827, 825.01

[56] References Cited

U.S. PATENT DOCUMENTS 4,382,294  5/1983  Beuscher et al. ..................... 370/16

OTHER PUBLICATIONS

Telecom Report 4 (1981); Beiheft, "Digital Vermittlung-System EWSD"; Siemens Aktiengesellschaft; 1981; pp. 1–74.

Primary Examiner—Douglas W. Olms
Assistant Examiner—Frank M. Scutch, III
Attorney, Agent, or Firm—Jeffrey P. Morris

[57] ABSTRACT

A circuit for a centrally controlled time division multiplex telecommunication exchange having PCM line-/trunk groups connected to a switching network wherein each line/trunk group comprises a plurality of line units to connect one time division multiplex interexchange trunk each and is connected to a switching network over a time division multiplex line. Two line-/trunk groups are assigned to each other in pairs. The connection devices which are assigned to one and to the other of two line/trunk groups and which in normal operation are connected with the time division multiplex switching device of each of their own line/trunk group can be changed over during emergency operation of one of the two line/trunk groups to the time division multiplex switching device of the other line/trunk group.

3 Claims, 2 Drawing Sheets

CIRCUIT ARRANGEMENT FOR CENTRALLY CONTROLLED TIME DIVISION MULTIPLEX TELECOMMUNICATION EXCHANGE FACILITIES

BACKGROUND OF THE INVENTION

1. Field of the Invention

The present invention relates to a circuit arrangement for centrally controlled time division multiplex telecommunications exchange facilities, especially PCM long distance exchange facilities with a multistage central switching network having time division multiplex inputs and time division multiplex outputs and a central processor and with several line/trunk groups to connect time division multiplex inter-exchange trunks of which each is connected to a time division multiplex input and a time division multiplex output of the switching network and of which each has several line units to connect to a time division multiplex interexchange trunk. The units in turn are connected to a time division multiplex switching device associated with that particular line/trunk group and connectable via these with channels of the time division multiplex input corresponding to each line/trunk group and the corresponding time division multiplex output of the switching network.

2. Description of the Prior Art

Long distance exchange facilities generally as described above have become known through the journal "telcomreport", 1981, 4th year, supplement "Digital-vermittlungssystem EWSD" pages 19 through 72. Time division multiplex interexchange trunks always include a large number of channel pairs, for example, twenty-four, thirty, sixty or more. A channel pair always comprises one channel in one transmission direction and another channel in the other transmission direction. For each connection, one chnnel pair is required (aside from so-called multi-channel connections). As the publication in the telecom report journal mentioned describes a large number of line/trunk groups are provided per long distance exchange with a switching network which has been duplicated as a precaution. Each line/trunk group comprises several line units. There are line units of different kind according to the specific kind of the connected line. Subscriber lines are, as a rule, analog lines, however, they can also be constructed using PCM techniques. Interexchange trunks may also be analog lines. They may, however, also be PCM channels which in the manner customary in PCM transmission systems are included with one time division multiplex line each. The line units mentioned above are fashioned differently, each one corresponding to the techniques of the subscriber line and interexchange trunks which need to be connected and depending on whether or not analog techniques or time division multiplex techniques have been used. As a rule, one connection device is provided for several of, for example, eight analog subscriber lines. Likewise, one line unit is provided for several analog interexchange trunks. Per time division multiplex interexchange trunk of one PCM transmission system one seperate connection device is provided, as a rule. It would, however, be equally possible, to connect to one single connection device more than one time division multiplex interexchange trunk of a PCM transmission system, for example, two time division multplex lines.

Through the natural combination of a number of channels, mentioned, for example, above into a single PCM transmission system, it is understood, that they are assigned to traffic in one direction only, for the channels under consideration have to follow the same course as the time division multiplex lines of this PCM transmission system. Since, however, on the basis of this combination the connection of one time division multiplex line of a PCM transmission system to a line unit also an assignment of those channels to one single line unit and thus to one single line/trunk group is given, the result is, in case for one traffic direction only the channels (channel pair) of a single PCM transmission system are available, that in case of failure of one line/trunk group all connection possibilities in that particular traffic direction are out of operation, thus, from the point of view of exchange techniques a whole direction trunk group.

In order to avoid the aforementioned effect of total failure of one direction trunk group solely due to the failure of one line trunk group, until now the usual measures in such cases have been to provide two PCM transmission systems independent of each other per traffic direction and to connect the time division multiplex lines of these transmission systems to line units of two different line/trunk groups. This is, because of the duplication of the PCM transmission systems especially with small direction trunk groups involved and not cost-effective.

It is the objective of the invention to provide ways in a switching arrangement of the kind described hereinbefore in view of the possibility of failures of a line group to provide means which would eliminate the duplication of a PCM transmission system per traffic direction and thereby avoid that due to the failure of a single line/trunk group in a traffic direction, which means the channel pairs of that particular PCM transmission system, respectively must fail.

The invention solves the problem in that two line/trunk groups each are assigned to each other in pairs and that the connection devices of each of these two line/trunk groups, which under normal operations are connected with the time division multiplex switching device of their own line/trunk group, in an emergency situation affecting one of the two line/trunk groups can be switched over to the time division multiplex switching device of the other line/trunk group.

SUMMARY OF THE INVENTION

The invention enables a PCM transmission system with its channels to be continued to be operated in case of failure of the associated line/trunk group. In this case, therefore, twice the number of channels (channel pairs) is transmitted via a line/trunk group, i.e. via the other of the two line/trunk groups assigned in pairs to each other.

This leads to an especially heavy traffic load on that particular line/trunk group and to an increase of cases where all paths are busy, however, all connections in the process of being established over those channels have the same success rate. It may happen, thereby that several traffic directions can only be operated with half the traffic capacity. However, connections can still be established in all traffic directions and the total failure of the primarily affected traffic direction is avoided.

According to a further embodiment of the invention it is provided that the line units can be accessed by the central processor via a normal operation address and an emergency operation address each and that in case of operational problems in one line/trunk group respectively its group control device, the emergency operation address of that particular line unit which under normal operating conditions is blocked in the central processor becomes unblocked and instead the normal operation address becomes blocked. In this way, control of the line unit in the emergency situation is very simple.

According to a further embodiment of the invention, which, in case of a changeover from normal to emergency operation and vice-versa, allows a control procedure which remains consistent, it is provided that the line units can be accessed by the central processor via the signal channels assigned the line/trunk groups with one address each which includes a first address part referring to that particular line/trunk group and a second address part referring to a particular line unit with it, that an address signal channel converter in the central processor in the presence of information for a line unit from the address attached to this information on the basis of its first address part produces a signal channel number used by the processor to access that particular signal channel, that after access has been achieved the address as well as the information concerning it is transmitted, and that in the event of one of the above mentioned operational failures the processor exchanges the address of that particular line/trunk group in the address signal channel converter against that of the other and the other way around after the emergency no longer exists.

This results in the event of a breakdown in one of the line/trunk groups, that the control of the line unit in the emergency operation situation can be constructed very simply.

DESCRIPTION OF THE PREFERRED EMBODIMENT

The description of the preferred embodiment is based in part on known time division multiplex long distance exchange facilities with PCM technology as described in the technical literature in detail, for example, in the journal mentioned before "telecom report". Therein are described, inter alia, on page 19 (pp) peripheral line groups in this long distance exchange system. In drawing 20 two line/trunk groups LTG1 and LTG2 are represented in excerpts which are associated with a centrally controlled time division multiples long distance exchange facility in PCM technology according to FIG. 1. They are connected to in the manner known in the art via time division multiplex lines L1 and L2 to a multistage switching network K, not shown here according to FIG. 1 which has time division multiplex inputs and time division multiplex outputs and which is central and duplicated. In accordance with the duplication of this switching network each one of these connections is twofold. Each one of these two time division multiplex lines provided per line/trunk group, for instance LTG1, is also—as described in the previously mentioned patent and shown in detail—connected to a time division multiplex input and time division multiplex output of this switching network.

Figure 1:
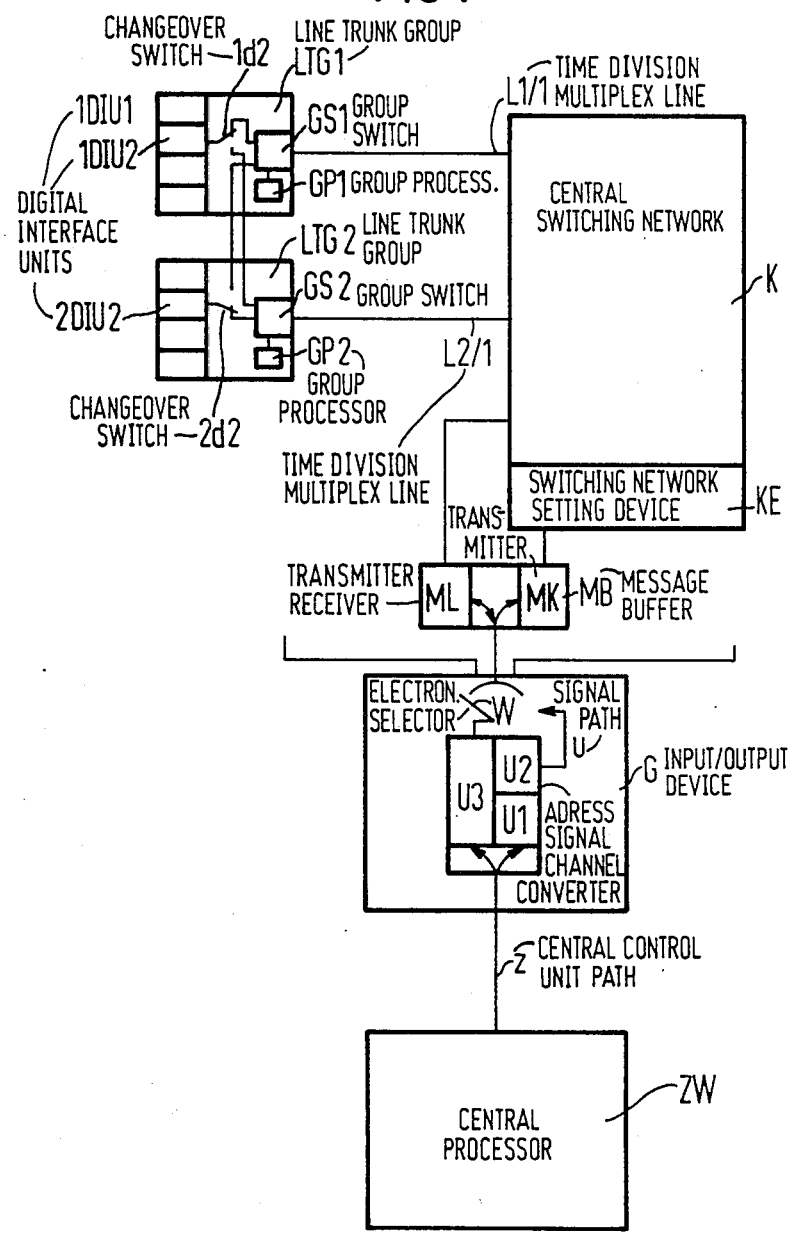
FIG. 1 is a block diagram of a long distance exchange of the kind described also in the German Pat. No. 3 1287 365.
Figure 2:
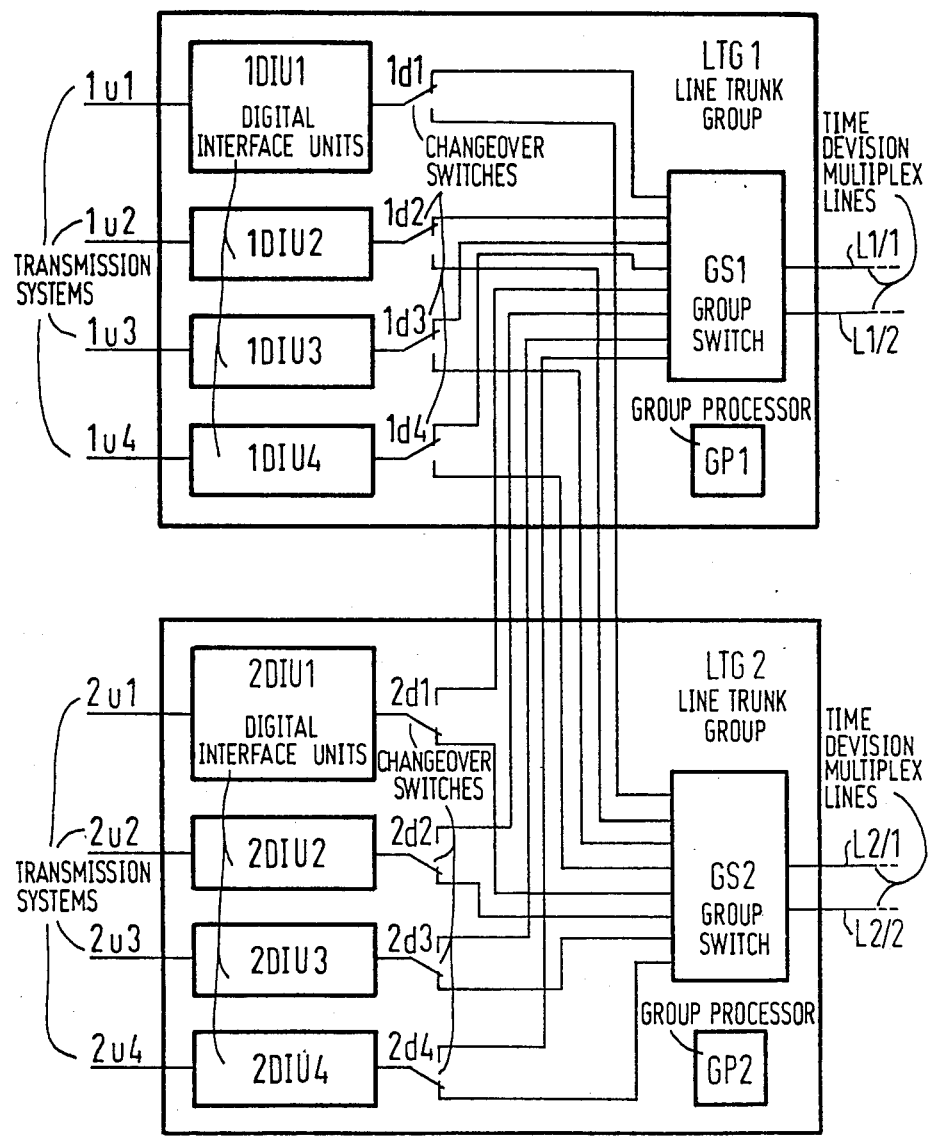
FIG. 2 shows further improvements essential to the present invention.

Further, according to FIG. 1, a central processor ZW is provided with the aid of which the entire control process for the connection establishment over the central switching network K can be accomplished in ways known in the art via buffer device MB/MK and switching network setting device KE described in detail in the mentioned patent. For that purpose, information by the central processor ZW (central control unit) is obtained from the line/trunk groups, for example, LYG1 and others, as well as carried to them the other way around. Individual control units GP1, GP2 and others like them have in the line/trunk groups supporting function as is known. For this information exchange the line/trunk groups and the line units addressed in them are accessed.

The information which has to be transmitted by the central processor ZW to them which may also be call commands for calling line/trunk groups or information to be transmitted from the line units to the central control unit, for example, selection information is always preceeded by an address characterizing that particular line unit. It is necessary that a line unit needs to be accessed by the processor ZW for transmission of information (if necessary call command) from the latter to the former, it transmits the address and the information successively after one another initially to an input/output device G (in "telcom report": IOP). It accepts both and stores them.

As is explained in the German patent previously mentioned, data lines exist between the input/output device G on the one hand, and each of the line/trunk groups and, in particular, their individual control units, for example, GP1, GP2, and, on the other hand, via the time division multiplex lines L1/2 respectively L2/2 and in particular via one channel per time division multiplex line as well as via the switching network K and via the buffer devices MB/ML. If the input/output device has received information and address from the central control unit ZW via path z, it carries from this address a first address part, among others, to an address signal channel converter U1/U2. This first address part corresponds to a line/trunk group and thus to the data line associated with it via buffer device MB and switching network K. The converter U1/U2 mentioned gives control information a corresponding to the first address part which it carries via the control path to an electronic selector W which is thereby set to the particular signal channel (via MB). In this way, the input/output device C is through it connected with the individual control device, for example, GP1, of that particular line/trunk group, for example, LTG1 and transmits now to it the information in addition to the complete address, i.e. including the first address part.

A large number of line/trunk groups are provided to serve the connection of time division multiplex interexchange trunks assigned to different traffic directions of which the two line/trunk groups LTG1 and LTG2 are shown in excerpts. Significance, purpose, and function of these line/trunk groups are described in the mentioned journal in great detail. In the present case these facts are assumed to be known.

As can also be seen in the previously mentioned "telecom report" journal, each one of the line/trunk groups contains several line units. These serve in the known manner to connect subscriber lines, interexchange trunks or transmission systems with channels which c n be occupied according to each connection. There are different kinds of line units, for example, those for analog subscriber lines, others for digital subscriber lines, others for analog interexchange trunks and others.

Likewise, there are line units which serve the connection of one time division multiplex interexchange trunk which, as is known, can comprise a large number of, for example, up to twenty-four or thirty PCM channels which can be occupied by each connection. As is known, this involves strictly speaking a channel pair per connection whereby one of the channels is provided for transmission in one direction and the other for transmission in the other direction.

In the "telecom report" journal is described in detail the purpose for which the mentioned line units serve. One line unit of analog subscriber lines respectively analog interexchange trunks is provided for several lines. Line units for time division multiplex operated transmission systems which each comprise a large number of channel pairs are so constructed that one transmission system with twenty-four or thirty channel pairs is connected to one line unit. In the mentioned "telecom report" journal it is further described that in a line/trunk group equipped with line units for time division multiplex transmission systems a total of four or five such line units are provided. Furthermore, the "telecom report" journal describes that within a line/trunk group, line units are connected with a time division multiplex switching device of the line/trunk groups and over these are connectable with channels of the time division multiplex inputs corresponding to that particular line/trunk group and the ocrresponding time division multiplex outputs of the central switching network.

In this numerical assignment a problem is to keep the traffic load on the different segments of the connection paths balanced with respect to each other as much as possible. This means, practically, that the number of channel pairs which comprise the time division multiplex interexchange trunks (PCM transmission systems of which each may be assigned to a different traffic direction, which, however, also in pairs of several together can be assigned to one and the same traffic direction) connected to a line unit of a line/trunk group is approximately equal to the number of channel pairs which are comprised in the time division multiplex interexchange trunk which connects that particular line/trunk group with the central switching network. Thus, the transmission system iu1 to iu4 may have the same number of channel pairs as the time division multiplex line Li.

Since it may happen that time division multiplex lines may fail due to operational trouble which is also true for the time division multiplex lines Li/1, Li/2, and L2/i, the consequence would be that of the time division multiplex transmission systems which are connected to the line units of that particular line/trunk group none would be available for establishing a connection. Since in exchange techniques with the given values and data concerning the number of channel pairs per traffic direction frequently only one single transmission system per traffic direction needs to be provided, in case of failure of the time division multiplex line connecting a line/trunk group to the central switching network, that particular transmission system, per traffic direction would fail also. The same is true in case of failure of the individual control device, for example, GP1, of a line/trunk group, for example LTG1.

In order to preclude such disadvantageous possibilities, it is provided that two line/trunk groups are each in paris assigned to each other. What is true in this respect for both of the line/trunk groups LTG1 and LTG2 shown in the drawing in excerpts, it is true also for all further line/trunk groups with connection devices to which the PCM transmission systems are connected in the indicated manner. Furthermore, it is provided that the connection devices 1 DIU 1 to IDIU 4 and 2 DIU 1 to 2 DIU 4 of each of these two line/trunk groups LTG1 and LTG2 which under normal operation are connected with the time division multiplex switching device, GS1 respectively GS2 of their own line/trunk group LTG1 and respectively LTG2, can be changed over to the time division multiplex switching device, for example GS 1 of the other line/trunk group, for example, LTG1. Changeover switches 1 d 1 to 1 d 4 and 2 d 1 to 2 d 4 are provided. These are represented in the figure in the normal position corresponding to normal operation. During a change from normal operation to emergency operation they are switched over to their operating position. The emergency operation situation is then in effect and is dependent on the fact that in a line/trunk group failure caused by problems of the kind mentioned before occurred.

If now the changeover switches 2 d 1 to 2 d 4 during a change from the normal operation situation to the emergency operation situation on the basis of a failure caused by problems of the time division multiplex line L2 the changeover switches 2 d 1 to 2 d 4 are switched from their normal position shown to their operating position from this point in time on the line units 2DIU to 2DIU4 of the line/trunk group LTG2 are connected with the time division multiplex switching device GS1 of the line/trunk group LTG1. Therefore, in case of a failure of the time division multiplex line L2, the PCM transmission systems 2u1 to 2u4 can continue to be operated with their channels which can be occupied depending on the individual connection. Each of these PCM transmission systems can be assigned singly to an individual traffic direction. However, two or more PCM transmission systems can be assigned to one traffic direction, that is, they can also, with respect to switching, form a common trunk group of channel pairs.

In a changeover undertaken in the way previously described, the connection existing until that point over the channel pairs of the time division multiplex line 12 are interrupted. It is however, possible to provide for the case that those channels which are occupied for the case that those channels which are occupied for message lines (i.e. voice connections) are not affected by the occurring trouble, the already established connection remains in existence. According to all rules, this will, however, be the case anyhow, particularly solely on the basis of the occurrance of that operating disturbance which was the cause of the subsequent changeover. In a manner known in the prior art, the participating subscriber will receive an appropriate audio signal, for example, a busy signal and they can then re-establish the desired connection. The corresponding is true for the case in which the changeover switching occurs in the reverse direction from the emergency operation situation to the normal operation situation, for example, when the changeover switches 2d1 to 2d4 are placed back into their shown normal position. In this case also, existing connections are interrupted and must be re-established by the participating subscribers, except that—as mentioned before—the particular connections may remain established. The corresponding is true in the case where the line/trunk group LTG1 instead changes from the normal operation situation to the emergency situation and vice-versa.

If a line/trunk group, for example the line/trunk group LTG2, changes over in the manner described from the normal operation situation to the emergency operation situation all channel pairs which are enclosed by the transmission systems 1u1 to 2u4 can only be further exchanged over the time division multiplex line L1 respectively its channel pairs. This takes place in the time division multiplex switching device GS1 in a known manner (with respect to the through-connecting processes within these time division multiplex switching devices). As a consequence, this changeover situation (with respect to the changeover switches 2d1 to 2d4) is affected by a significantly higher traffic load.

Since as is known, at each point in time numerically no more connections over the channel pairs of this time division multiplex line L1 can be switched through than there are channel pairs available, the channel pairs of the transmission systems 1u1 to 2u4 cannot be loaded with only approximately half of the traffic load. This means, that on the average the channel pairs in each of these transmission systems 1u1 to 2u4 to some extent cannot be used. However, according to the invention, it is ensured that each of these transmission systems can be continued to be operated. In this way it is ensured that for each of the traffic direction connection possibilities still exist, even though these are numerically limited. No traffic direction needs to fail if one of the time division multiplex lines L1/1, L1/2, L2/1, L2/2 (or any other) fails due to problems. As in the known case, the time division multiplex connection lines L1/1, L1/2 and L2/1, L2/2 from each of the line/trunk groups (LTG1, LTG2) to the switching network duplicated as is the switching network itself and each line/trunk group is connected over the one and the other time division multiplex line singly with the one and the other of these two switching networks. In the event of faults at the central location, for example, in the switching network K, a changeover takes place in the known manner without, respectively, in order to avoid disruption in the operation.

In this connection, provisions can also be made that the emergency operation situation is evaluated such that of the channel pairs of each of the transmission systems 1u1 to 2u4, half are blocked. The blocked channel pairs are then, for new occupation by the newly established connections, unavailable so long as the emergency operation situation continues. It is also possible, to announce the emergency operation situation to those exchanges with which the exchange is connected over the particular transmission system 1u1 to 2u4. It is possible to make provisions that in these other exchanges also the particular transmission systems with regard to the channel pairs contained in them are makred partially as blocked until the state of emergency operation situation is ended again. By this means in other exchanges (as well as in the immediately affected exchange) the link selection as well as the automatic alternative routing might be influenced, for example, with respect to an appropriate change of the line selection program and/or the valid and paractical routing rules of importance with respect ito link selection.

As mentioned before, the connections are established over the central switching network K. The central processor Z is involved in this process. In the central processor the line/trunk groups, the line units contained in them as well as the channel pairs conducted over each of these, with the aid of addresses, accessible. It can be provided that each of the lihne units with a normal operation address as well as with an emergency operation address is accessible from the central processor. These normal operation addresses and emergency operation addresses are thus within access on these addresses depending on the requirements of the operation. In this case, provisions are made that the line units wired with POM transmission systems are controllable by the central processor through a normal operation address and an emergency operation address each and that in the event of a disturbance in normal operating procedure in one of the line/trunk groups, for example, LTG2, respectively their group control device, for example GP2, unblocks the emergency operation addresses of the particular line units, for example, 2DIU1 to 2DIU4 which during normal operation are blocked in the central processor and instead blocks the normal operation addresses of these line units. In ways not represented in detail, the central processor is informed that a line/trunk troups, for instance, LTG2 is changing from normal operation to emergency operation. On the basis of this message the central processor undertakes the process previously described of unblocking the emergency operation addresses of the particular line units as well as the blocking of the normal operation addresses of these line units. The same is equally applicable to access-addresses of the channel pairs which are conducted over the particular line units. In this connection it is additionally provided that the line units, for example, 2DIU1 to 2DIU4 are accessible by the central processor with the normal operation address over the line/trunk group associated with it, for example, LTG2 directly and with the emergency operation address over the other line/trunk group, for example, LTG1.

In the same way as the previously described changeover switching of the connection paths (all channel pairs) with the changeover switches 2d1 to 2d4 takes place, the central clock pulse supply of the particular line units in changing from normal operation to the emergency operation is changed over from the associated line/trunk group to the other line/trunk group. Thereby it is ensured that the line units run pulse-synchronous with the particular line/trunk group to which the changeover has occurred. In the same way, supply with the required operating voltage for the particular line units can be switched over from the particular line/trunk group which changed from normal operation to emergency operation to the other line/trunk group. It is even more favorable to construct the devices for the operating voltage supply to be redundant, that is, failure-safe, for example, twice for all line units of both line/trunk groups.

According to another, especially significant embodiment of the invention it is provided that the line units from the central processor over the signal channel associated with the line/trunk groups are accessible with an address which comprises a first address part characterizing the particular line/trunk group and a second address part characterizing the line unit within it. This has been mentioned already. With the first address part of the address of the particular line unit that line/trunk group is accessed to which the particular line unit belongs. Accessing of the line/trunk group takes place in the indicated manner in that on the basis of the first address part a setting information is formed in the address signal converter U1/U2 which is sent over the control path u to the electronic selector W through which the input/output device G is connected over the buffer device MB with the signal channel held ready in a through-connected state over the switching network K, the signal channel is conducted over a time division multiplex line, for example, L1/1 to the particular line/trunk group. Thus, an address signal channel converter G is provided in the central processor which when information is present produces a signal channel number for a line unit out of the address associated with the information on the basis of its first address part to be used by the processor to access the particular signal channel. This signal channel number thus refers to the previously mentioned particular signal channel. This signal channel number serves as setting information which is transmitted further over the signal path u to the indicated electronic selector W for its setting to the particular signal channel. This electronic selector can be fashioned for example, as a coupler. The address signal channel converter G in the central processor ZW can be designed to be spatially separated from it. It serves, in a way known in the prior art, the processing of the input procedures and output procedures of the central processor ZW.

As already explained, during each accessing of a signal channel for the purposes of accessing the particular line/trunk group, the mentioned address as well as the information is transmitted over this signal channel. Address and information are transmitted over the signal channel to the particular line/trunk group and here over the mentioned time division multiplex switching device, for example GSI, first to the particular individual control device, for example GP1. It, on the basis of the address recognizes and in particular especially on the basis of the therein contained second address part, to which of the line units the particular information has to be sent on.

In the previously described connection one may start from the basis that the above mentioned address part refers to that line/trunk group to which address and information has been transmitted in the previously described manner. The second address part indicated which one of the line units within the particular line/trunk group, for example, LTG1 is the one to which the particular information has to be conducted further. It may be assumed that this is the line unit 1DIU2. Furthermore, it may be assumed that the particular line/trunk group, for example, LTG1 is in a state of normal operation. In this case the changeover switch 1d2 is in the normal position shown in the drawing. The line unit 1DIU2 is thus in this operating state connected over the normal side of the changeover switch 1d2 with the time division multiplex switching device GS1 of the line/trunk group LTG1.

As previously explained, the individual control device GP1 has with the information which is determined for the line unit 1DIU2 also received the address and stored temporarily which comprises a first address part referring to the line/trunk group LTG1 and a second address part referring to the line unit 1DIU2. On the basis of the first address part, the individual control device GP1 recognizes that the particular information has to be transmitted further to a line unit which belongs to the same line/trunk group LTG1. On the basis of the second address part, the individual control device GP1 recognizes that the information has to be transmitted further to the line unit 1DIU2. On this basis, the individual control device GP1 accesses the time division multiplex switching device GS1 such that a transmission path from the individual control device GP1 to the line unit 1DIU2 is connected-through which also runs over the normal side of the changeover switch 1d2.

As a modification of the previously described embodiment it can be provided that the individual control device GP1 in the stated connection does not also receive the information with the particular address but solely the address alone and based on it, connects-through a direct transmission path for the information from the signal channel running over the time division multiplex line L1/1 over the time division multiplex switching device GSl, the normal side of the changeover switch 1d2 to the connection device 1DIU2. In this case, the address is received over the signal channel in the individual control device GP1 and here used for the through-connection of a direct path from the mentioned signal channel to the particular line unit. In this case, a temporary storage of the particular information in the individual control device GP1 would be omitted.

The specific emergency operation situation will be explained. As already mentioned, an emergency operation situation caused by operational problems can have occurred because the signal channel between one line/trunk group and the central processor is not available or that the individual control device, for example, GP 2 and/or the time division multiplex switching device, for instance GS1 of that particular line/trunk group does not have the required functional capacity. This is, on the basis of continuous supervisory processes recognizable to the central processor. The supervisory processes have been described in detail in the already mentioned journal "telecom report", as well as in the German published patent application No. 3 106 903. If the central processor recognizes an operational disturbance which, for example, concerns the line/trunk group LTG2, then the entire further data exchange takes place between the central processor ZW and the line units 2DIU1 to 2DIU4 of the line/trunk group LTG 2 affected by the operational disturbance for the duration of the disturbance over the line/trunk group LTG1. For that purpose, all changeover switches of the affected line/trunk group LTG2 are set from their shown normal position into their operating position. This can take place in two ways. It can be set up such that the operational interruption which has occurred can be recognized by the line/trunk group within which the trouble occurred. This can take place in that the exchange which serves to check continuously the full functional capacity of each of the line/trunk groups with the central processor, in accordance with the last mentioned German published patent application no longer occurs and that this is recognized within the affected line/trunk group. On that basis, the mentioned actuation of the changeover switch 2d1 to 2d4 within the affected line/trunk groups can be undertaken by the group itself through its individual control device, for example, GP2. However, provisions can also be made that the central processor ZW recognizes the operational difficulties affecting the line/trunk group LTG2 and that it sends appropriate information concerning them to the individual control device GP1 of the line/trunk group LTG1 assigned in pairs and that they transmit a command for the actuation fo the mentioned four changeover switches in the line/trunk group LTG2 to them.

During operational difficulties affecting the line/trunk group LTG2, the changeover switches 2d1 to 2d4 are actuated. Correspondingly, the line units 2DIU1 to 2DIU4 are connected with the time division multiplex switching device GS1 of the line/trunk group LTG1.

If the central processor ZW recognizes the functional difficulties causing the operational difficulties of the line/trunk group LTG2, and if it recognizes that further data exchange with the particular connection units 2DIU1 to 2DIU4 has to be carried out over the signal channel of the line/trunk group LTG1, it transmits an appropriate information also to the address signal U1/U2 in the input/output device G. Through this information the signal channel number referring to the line units 2DIU1 to 2DIU4 in the line/trunk group LTG2 is changed temporarily. This means practically, that for the duration of the operational disturbance of the line/trunk group LTG2, during accessing of one of its line units the address signal channel converter transmits upon reception of an address with first address part referring to the line/trunk group LTG2 a control message over the control path u to the electronic selector W, which has the result that in this case instead of the signal channel of the line/trunk group LTG2, the signal channel of the line/trunk LTG1 is accessed by the electronic selector W. The central processor, thus gives for accessing of a line unit 2DIU1 to 2DIU4 during operational difficulties to the line/trunk LTG2 the address and the information for the particular line/trunk groups as during normal operation to the line/trunk group LTG2. In the address signal channel converter U1/U2 for the duration of the operational difficulties of the line/trunk group LTG2 is fixed that instead of its signal channel now the signal channel of the line/trunk LTG1 has to be accessed. The re-routing of the information concerning the operational difficulties of the line/trunk group LTG2 for its line units, thus, takes place in the input/output device with the aid of the electronic selector W on the basis of the temporary changes of the signal channel numbers stored in the address signal channel converter U1/U2 which from case to case can be called up from it as control information and can be transmitted for the control of selector W to it.

If a message together with the address associated with it consisting of a first address part and a second address part is transmitted to the line/trunk group LTG1 due to operational difficulties even though the particular information is meant for one of the connection units 2DIU1 to 2DIU4, the individual control device GP1 recognizes initially on the basis of the first address part that the particular information is intended for a connection unit of the other line/trunk group. Based on the second address part, the individual control device for which line units the message is intended. On the basis of the first address part and on the basis of the second address part, the individual control device GP1 sends the particular information on to the line unit of the other line/trunk group LTG2 for which it is intended. For that purpose, the individual control device GO1 connects-through a transmission path over the time division multiplex switching device GS1 over which the information is then transmitted. This takes place over an appropriate connection of the time division multiplex switching device GS1 and the operating side of the particular changeover switch for example 2d2. In this case also, the particular information can be temporarily stored in the individual control device GP1 and then transmitted from it to the particular line unit, for example 2DIU2 or in the above manner, providions can be made that in the here described operating case a direct path is through-connected from the signal channel passing over the time division multiplex line L1/1 over the time division multiplex switching device GS1 and over the changeover switch 2d2 being in operational state to the line unit 2DIU1.

In the previously described manner, information can be transmitted from the central processor to each of the line units as well as in the reverse direction. In this case, the information transmitted by the central processor to the particular line unit can be a fetch command, on the basis of which the information obtained and to be transmitted is transmitted in reverse direction from the particular line unit to the central processor. In this way, information transmission can take place from line/trunk group to line/trunk group as described in the German Pat. No. 3 128 365. In this fashion, information from one line unit of a line/trunk group to a line unit of another line/trunk group can be transmitted whereby this information does not need to be taken up by the central processor ZW but after arrival from one line unit in the input/output device G can be transmitted directly from here to the particular connection device for which it is intended. This is accomplished through transmission of the information within the input/output device G described in the aforementioned German patent.

We claim:

1. A circuit for a centrally controlled PCM time division multiplex telecommunication exchange having long distance facilities, comprising:

a multistage central switching network means having time division multiplex inputs and time division multiplex outputs and a central processor;

a plurality of line/trunk groups connected to time division multiplex interexchange trunks, each of said trunks being connected to a time division multiplex input and a time division multiplex output of said switching network means;

a plurality of line units connecting one time division multiplex interexchange trunk with a time division multiplex switching device associated with the particular line/trunk group and being connectable with channels of the time division multiplex input corresponding to the line/trunk group and the corresponding time division multiplex output of the switching network means; and wherein two line/trunk groups are assigned to each other in pairs such that the connection devices of each of said two line/trunk groups which are normally connected with the time division multiplex switching device of a respective line/trunk group are changed over to the time division multiplex switching device of another line/trunk group, and wherein the line units each include;

means coupled to the central processor with a first address for normal operation and with a second address for emergency operation such that for emergency operation a group control circuit means unblocks the emergency operation address of the particular line units and blocks the normal operation addresses.

2. A circuit according to claim 1 wherein the line units are coupled to the central processor by said normal operation address over a line/trunk group associated with said line units and by said emergency operation address over the other line/trunk group.

3. A circuit for a centrally controlled PCM time division multiplex telecommunication exchange having long distance facilities, comprising:

a multistage central switching network means having time division multiplex inputs and time division multiplex outputs and a central processor;

a plurality of line/trunk groups connected to time division multiplex interexchange trunks, each of said trunks being connected to a time division multiplex input and a time division multiplex output of said switching network means;

a plurality of line units connecting one time division multiplex interexchange trunk with a time division multiplex switching device associated with the particular line/trunk group and being connectable with channels of the time division multiplex input corresponding to the line/trunk group and the corresponding time division multiplex output of the switching network means; and wherein two line/trunk groups are assigned to each other in pairs such that the connection devices of each of said two line/trunk groups which are normally connected with the time division multiplex switching device of a respective line/trunk groups are changed over to the time division multiplex switching device of another line/trunk group;

wherein the line units are coupled to the central processor over a signal channel assigned to said line/trunk groups with one address which comprises a first address part corresponding to the line trunk group and a second address part corresponding to a line unit within said group; and an address signal channel converter in the central processor, for receiving information for a line unit, and including means to produce from said first address part of the signal channel channel number used by the processor to access the particular signal channel; and means for accessing said signal channel and transmitting the address and said information such that in the event of an operational difficulty the processor changes the address of the particular line/trunk group in the address signal channel converter.

* * * * *